(12) United States Patent
Hill

(10) Patent No.: US 7,403,524 B2
(45) Date of Patent: Jul. 22, 2008

(54) METHOD AND APPARATUS FOR PARALLEL PACKET SWITCHING

(75) Inventor: Alan M Hill, Ipswich (GB)

(73) Assignee: British Telecommunications public limited company, London (GB)

( * ) Notice: Subject to any disclaimer, the term of this patent is extended or adjusted under 35 U.S.C. 154(b) by 1129 days.

(21) Appl. No.: 10/203,556

(22) PCT Filed: Mar. 8, 2001

(86) PCT No.: PCT/GB01/01024

§ 371 (c)(1),
(2), (4) Date: Aug. 12, 2002

(87) PCT Pub. No.: WO01/67802

PCT Pub. Date: Sep. 13, 2001

(65) Prior Publication Data

US 2003/0016687 A1    Jan. 23, 2003

(30) Foreign Application Priority Data

Mar. 10, 2000    (GB) ................................. 0005899.0

(51) Int. Cl.
*H04L 12/28* (2006.01)
(52) U.S. Cl. ................... 370/392; 370/412; 370/429; 370/458
(58) Field of Classification Search ............... None
See application file for complete search history.

(56) References Cited

U.S. PATENT DOCUMENTS 5,469,154 A * 11/1995 Karp ..................... 340/2.22
5,940,389 A *  8/1999 Yang et al. ................ 370/380
6,125,112 A *  9/2000 Koning et al. ............. 370/388

OTHER PUBLICATIONS

Rana, D., A control algorithm for 3-stage non-blocking networks, Dec. 6-9, 1992, Global Telecommunications Conference, 1992. Conference Record., Globecom '92. 'Communication for Global Users'., IEEE, pp. 1477-1481 vol. 3.*

Collier, M., High-speed cell-level path allocation in a three-stage ATM switch, Nov. 28-Dec. 2, 1994, Global Telecommunications Conference, 1994. Globecom '94. 'Communications: The Global Bridge'., IEEE, pp. 324-328 vol. 1.*

(Continued)

*Primary Examiner*—Wing F. Chan
*Assistant Examiner*—Brian Roberts
(74) *Attorney, Agent, or Firm*—Nixon & Vanderhye P.C.

(57) ABSTRACT

Available time slot(s) in a packet switch are identified in order to route a packet from an input port to a designated output port. The status of each time slot is logically combined with regard to the input port and with regard to the output port to generate the status of the time slot with regard to the given input port-output port pair. The status of input port-output port pairs is logically combined in pairs to determine whether one of the input port-output port pairs is available and the step of pair-wise logically combining the status of input port-output port pairs is repeated to determine input port-output port pair availability until one available input port-output port has been identified.

8 Claims, 13 Drawing Sheets

OTHER PUBLICATIONS

Lin, Jeen-Fong et al., High-performance low-cost non-blocking switch for ATM, Mar. 24-28, 1996, INFOCOM '96. Fifteenth Annual Joint Conference of the IEEE Computer Societies. Networking the Next Generation. Proceedings IEEE, pp. 818-821 vol. 2.*

Lee, T.T.; Soung-Yue Liew; Parallel routing algorithms in Benes-Clos networks: INFOCOM '96. Fifteenth Annual Joint Conference of the IEEE Computer Societies. Networking the Next Generation. Proceedings IEEE vol. 1, Mar. 24-28, 1996 pp. 279-286 vol. 1.*

EPO Examination Report dated Apr. 3, 2006.

Marchok et al., "First Stage Multicasting in a Growable Packet (ATM) Switch", Proceedings in the International Conference on Communications, US, New York, IEEE, pp. 1007-1013, XP000269636 ISBN: 0-7803-0006-8.

Collier et al., "Cell-Level Path Allocation in a Three-Stage ATM Switch", International Conference on Communications (ICC), US, New York, IEEE, pp. 1179-1183, XP000438687.

Collier, Martin, "High-Speed Cell-Level Path Allocation in a Three-Stage ATM Switch," School of Electronic Engineering, Dublin City University, pp. 1-7.

* cited by examiner

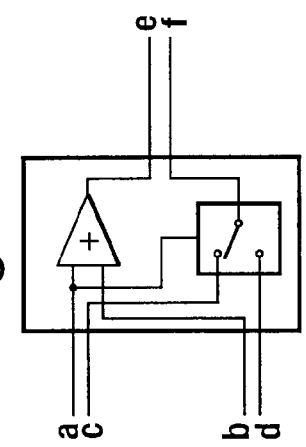
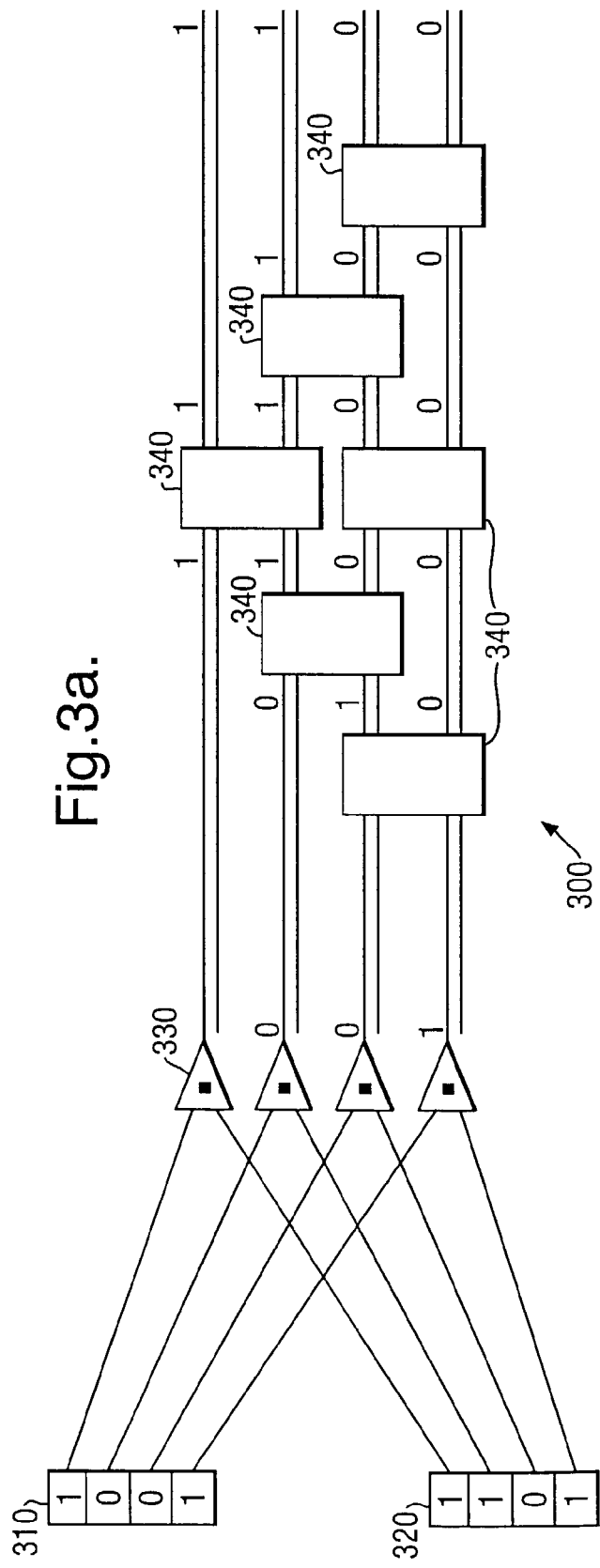

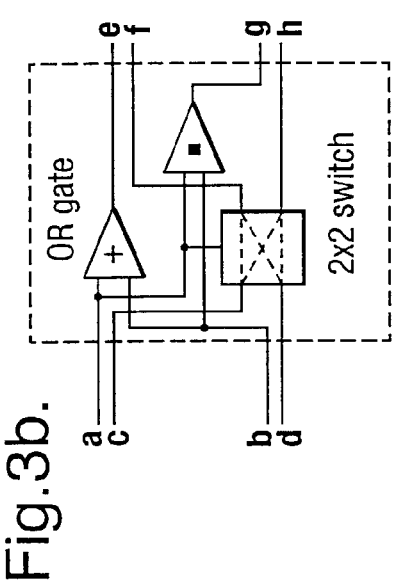
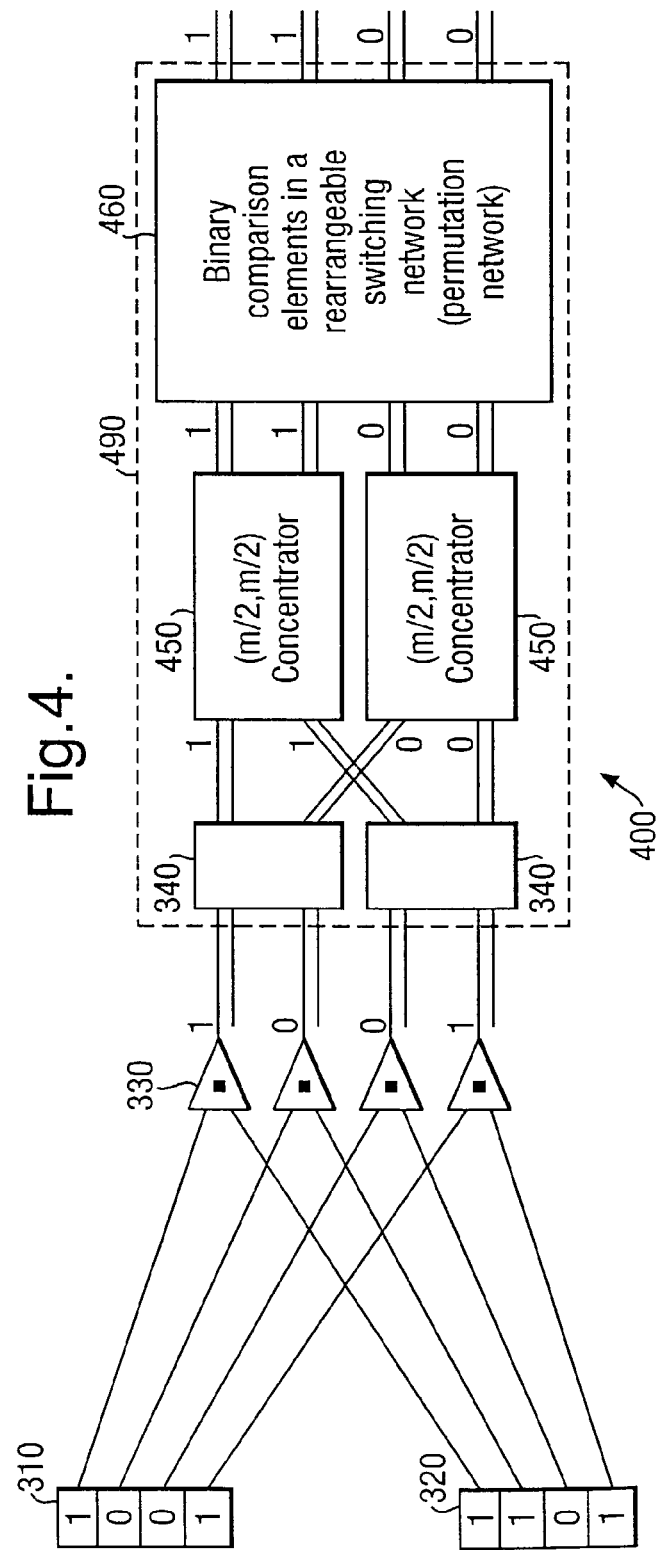

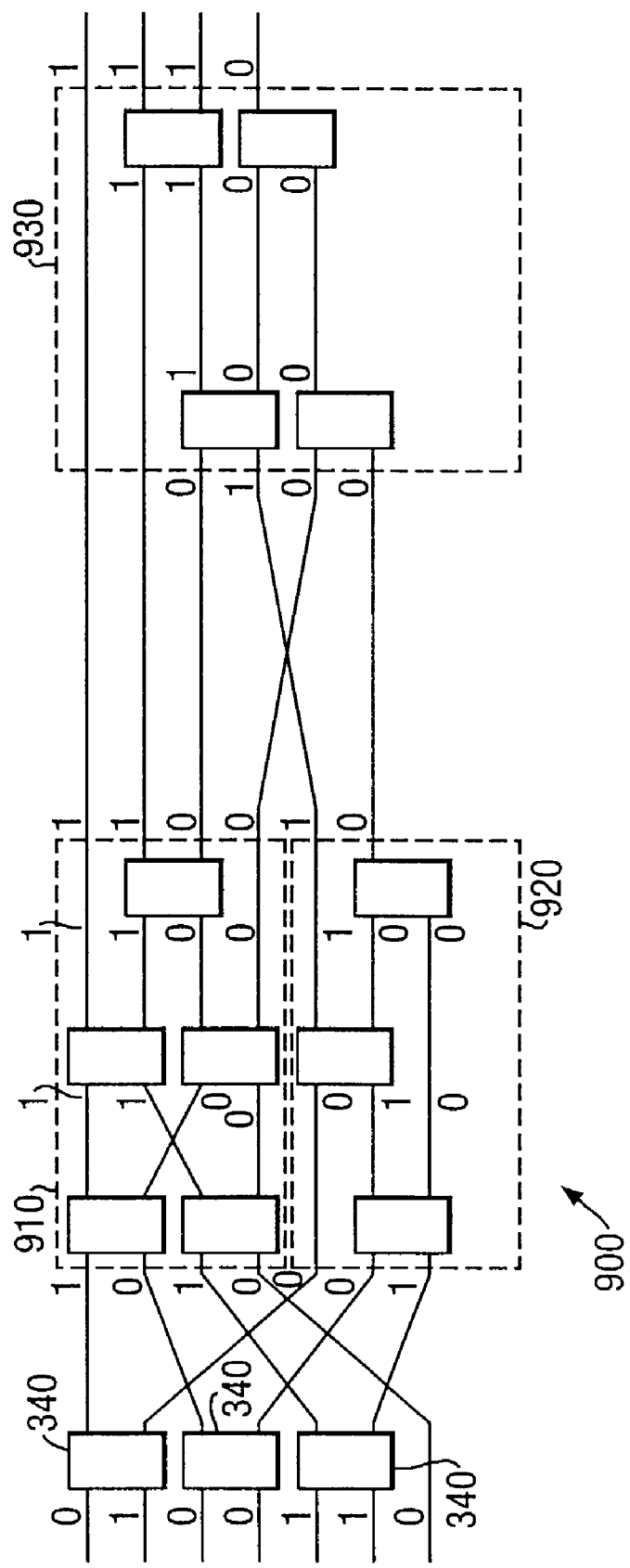

Fig. 8b.
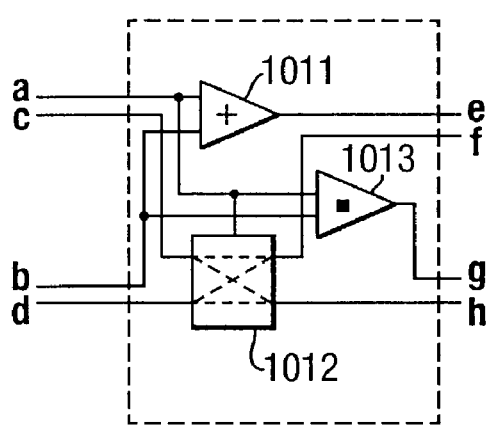
Fig. 8c.
| a | b | e | f | g | h |
|---|---|---|---|---|---|
| 1 | 1 | 1 | c | 1 | d |
| 1 | 0 | 1 | c | 0 | d |
| 0 | 1 | 1 | d | 0 | c |
| 0 | 0 | 0 | d | 0 | c |
Fig. 8d.
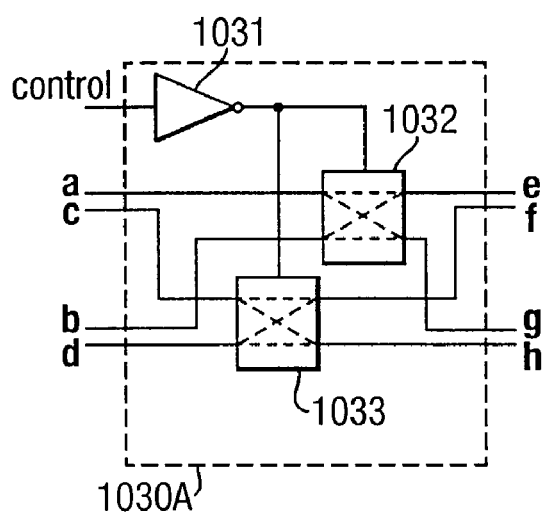
Fig. 8e.
| control | e | f | g | h |
|---|---|---|---|---|
| 0 | b | d | a | c |
| 1 | a | c | b | d |

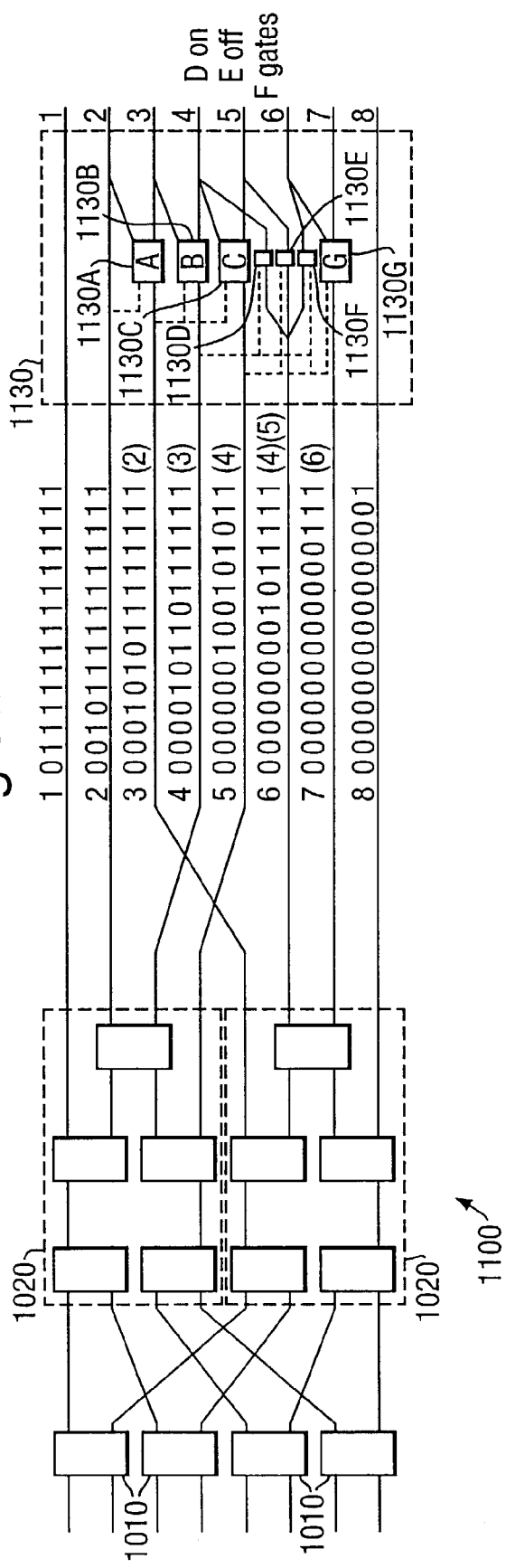

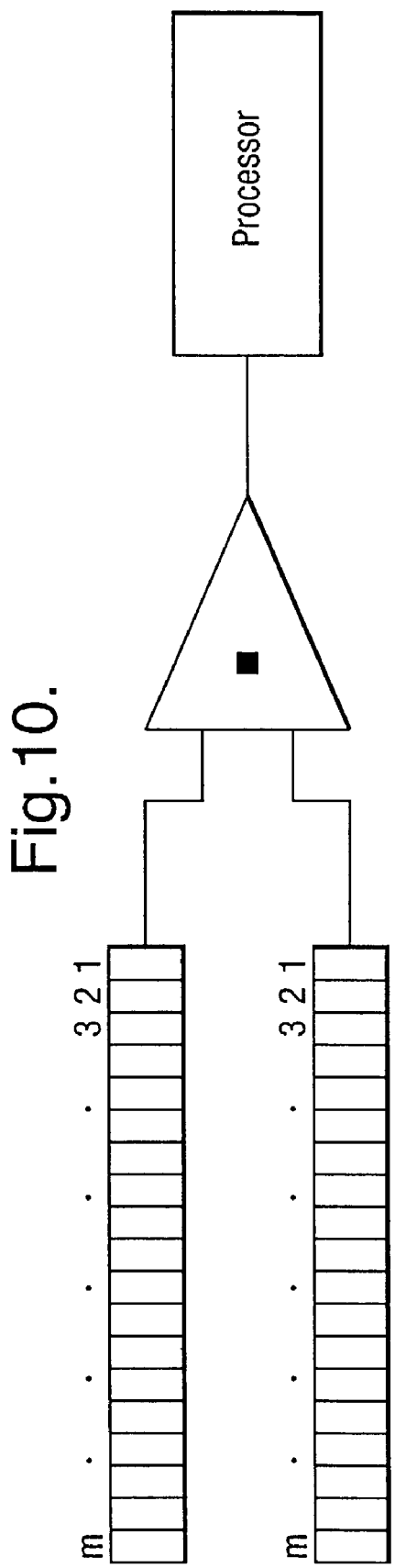

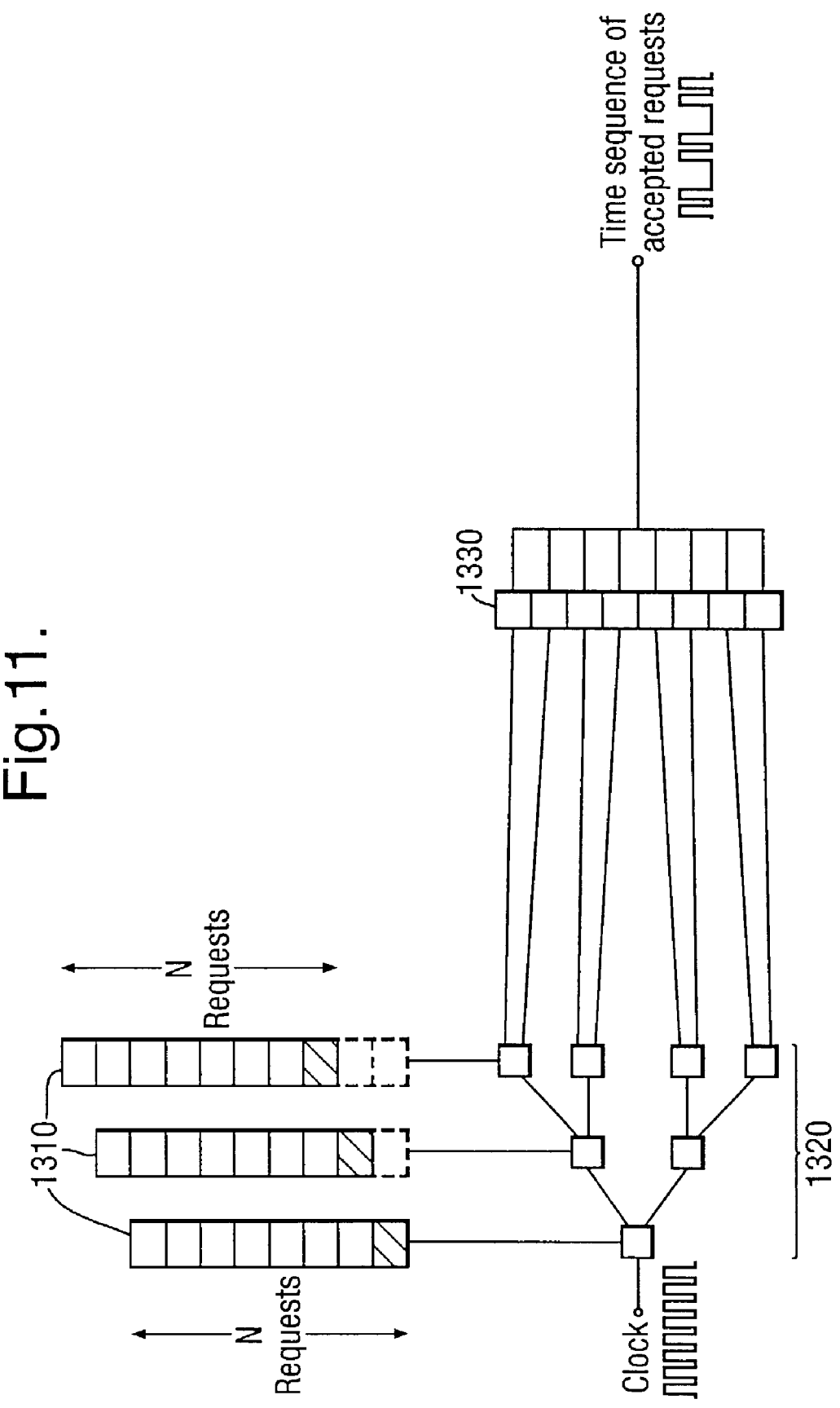

METHOD AND APPARATUS FOR PARALLEL PACKET SWITCHING

This application is the US national phase of international application PCT/GB01/01024 filed 8 Mar. 2001 which designated the U.S.

BACKGROUND

1. Technical Field

This invention relates to packet switching (or cell switching), in particular methods for allocating requests for switching from one of the inputs of a packet switch to one of the outputs of the packet switch and methods of fabric allocation within a packer switch.

2. Related Art

Input-buffered cell switches and packet routers are potentially the highest possible bandwidth switches for any given fabric and memory technologies, but such devices require scheduling algorithms to resolve input and output contentions. Two approaches to packet or cell scheduling exist (see, for example, A Hung et al, "ATM input-buffered switches with the guaranteed-rate property," and A Hung et al, Proc. IEEE ISCC '98, Athens, July 1998, pp 331-335). The first approach applies at the connection-level, where bandwidth guarantees are required. A suitable algorithm must satisfy two conditions for this; firstly it must ensure no overbooking for all of the input ports and the output ports, and secondly the fabric arbitration problem must be solved by allocating all the requests for time slots in the frame.

SUMMARY

According to a first aspect of the invention there is provided a method of a method of allocating switch requests within a packet switch, the method comprising the steps of
(a) logically combining the status of each time slot with regard to the input port and with regard to the output port to generate the status of the time slot with regard to the given input port-output port pair;
(b) logically combining in pairs the status of input port-output port pairs to determine whether one of the input port-output port pairs is available; and
(c) repeating step (b) iteratively until one available input port-output port has been identified.

According to a second aspect of the invention there is provided a method of allocating switch requests within a packet switch, the method comprising the steps of;
(a) logically combining the status of each time slot with regard to the input port and with regard to the output port to generate the status of the time slot with regard to the given input port-output port pair; and
(b) processing the inlet-outlet pair status information generated in step (a) in a logical concentrator so that the available input port-output port pair(s) are ordered hierarchically.

According to a third aspect of the invention there is provided a method of allocating switch requests within a packet switch, the method comprising the steps of;
(a) establishing switch request data at each input port;
(b) processing the switch request data for each input port to generate request data for each input port-output port pairing;
(c) comparing the number of requests from each input port and to each output port with the maximum request capacity of each input port and each output port; and
(d) allocating all requests for those input-output pairs where the total number of requests is less than or equal to the maximum request capacity of each input port and each output port;
(e) reducing the number of requests for those input-output pairs where the total number of requests is greater than the maximum request capacity of each input port and each output port such that the number of requests is less than or equal to the maximum request capacity of each input port and each output port; and
(f) allocating the remaining requests.

The present invention additionally provides a method of allocating switch requests within a packet switch, the method comprising the steps of;
(a) establishing switch request data at each input port;
(b) processing the switch request data for each input port to generate request data for each input port-output port pairing;
(c) allocating a first switch request from each of the input port-output port pairing request data, the requests being allocated only if the maximum request capacity of the respective output port has not been reached; and
(d) allocating further switch requests by the iterative application of step (c) until the maximum request capacity of each output port has been reached.

BRIEF DESCRIPTION OF THE DRAWINGS

The invention will now be described with reference to the following figures in which;

FIGS. 2a-c are schematic depictions of an apparatus according to an exemplary embodiment of the present invention;

FIGS. 3a-c are schematic depictions of a half-matrix concentrator according to an exemplary embodiment ofto the present invention;

FIG. 4 is a schematic depiction of a concentrator according to an exemplary embodiment of the present invention;

FIG. 7 is a schematic depiction of a (7,4) concentrator according to the second exemplary embodiment of the present invention;

FIGS. 8a-e are schematic depictions of a (8,8) concentrator according to a third exemplary embodiment of the present invention;

FIGS. 9a-b are schematic depictions of a (8,8) concentrator according to a fourth exemplary embodiment of the present invention;

FIG. 10 is a schematic depiction of an apparatus for determining sequentially the address of a common middle-stage switch;

FIG. 11 is a schematic depiction of an apparatus for preventing the overbooking of output ports according to an exemplary embodiment of the present invention.

DETAILED DESCRIPTION OF EXEMPLARY EMBODIMENTS

Figure 1:
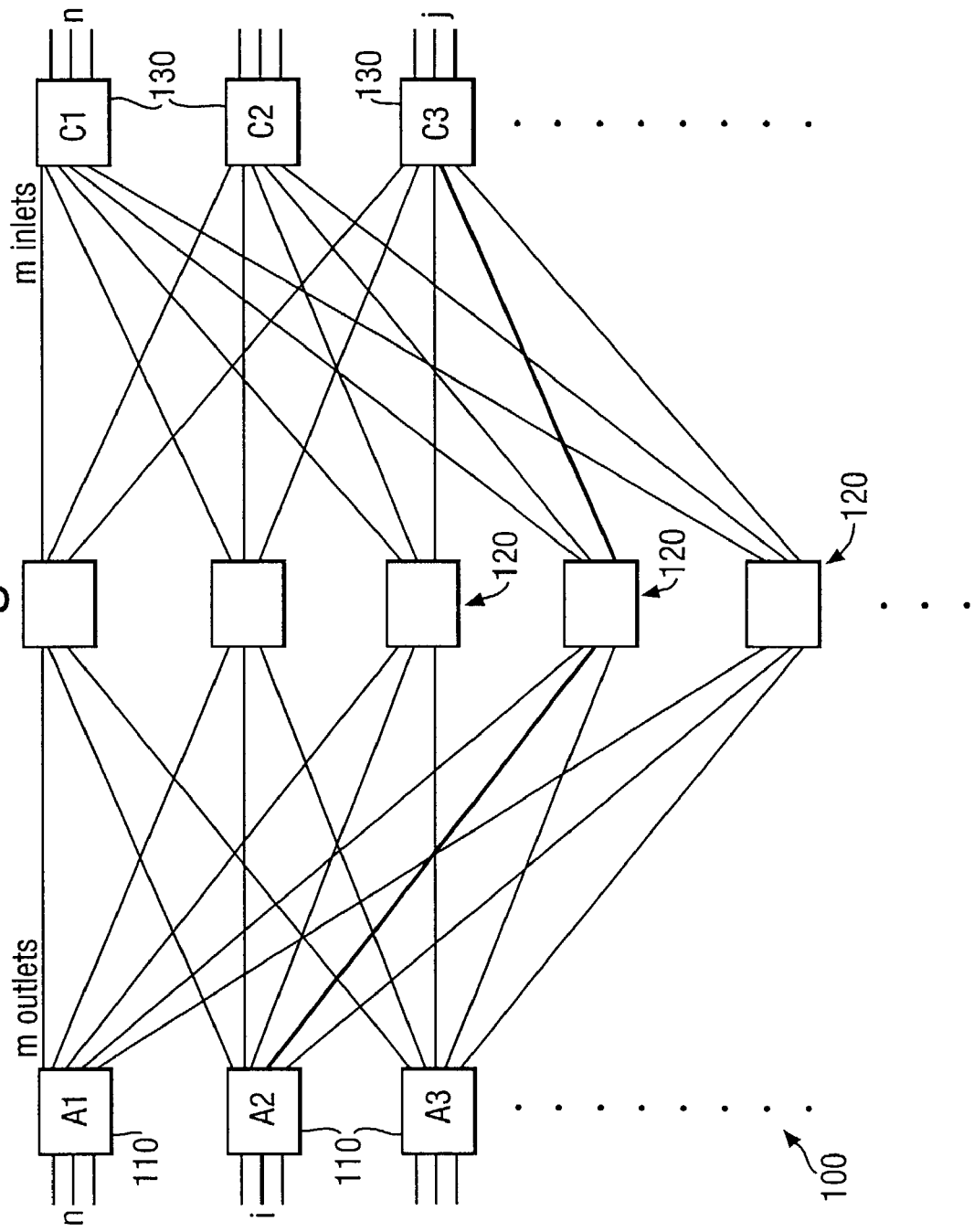
FIG. 1 is a schematic depiction of a three stage switch.

FIG. 1 shows a three-stage switch 100 which comprises a plurality of first stage switches 110, a plurality of middle stage switches 120 and a plurality of third stage switches 130. Each of the first stage switches is connected to all of the middle stage switches, and all of the middle stage switches are connected to each of the third stage switches so that any first stage switch can be connected to any third stage switch, via any of the middle stage switches. The three-stage switch 100 has p first stage switches 110 and p third stage switches 130, each of which is connected to n ports (input ports for the first stage switches 110 and output ports for the third stage switches 130). The total capacity of the three-state switch is N input ports and N output ports, where N=nxp. The number of middle stage switches is m, where for a non-blocking switch m=2n−1. Each first stage switch has m outlets to the middle stage switches, one outlet being connected to each middle stage switch. Similarly, each third stage switch has m inlets from the middle stage switches, one inlet being connected from each middle stage switch. (Although the following discussion assumes the use of a non-blocking switch, the present invention may also be used with lower values of m, as long as m remains greater than or equal to n.)

The inventor has had the insight that techniques that can be applied to the setting-up of connections between the input ports and the output ports of circuit-based switches may also be applied to packet-based (or cell-based) switches.

If a single call processor is employed to control connection set-ups in the symmetric three-stage packet switch of FIG. 1, the maximum number of processing steps required to find a free, common middle-stage switch through which to connect one of the N input ports i to one of the N output ports j is essentially the number of outlets and inlets, m, on the first and third stage switches $A_2$ and $C_3$ respectively. In the prior art it is known to compare sequentially the statuses of every outlet/inlet pair attached to the same middle-stage switch, stepping through the middle-stage switches, until the first pair is found that are both unused. To make N connections across the switch therefore requires a maximum of O(Nm) processing steps. For a strictly non-blocking Clos switch with m=2n−1, and for which n≈$(N/2)^{1/2}$ to minimise the number of matrix crosspoints needed to interconnect a total of N ports, this results in $O(N^{3/2})$ computing steps.

Figure 2A:
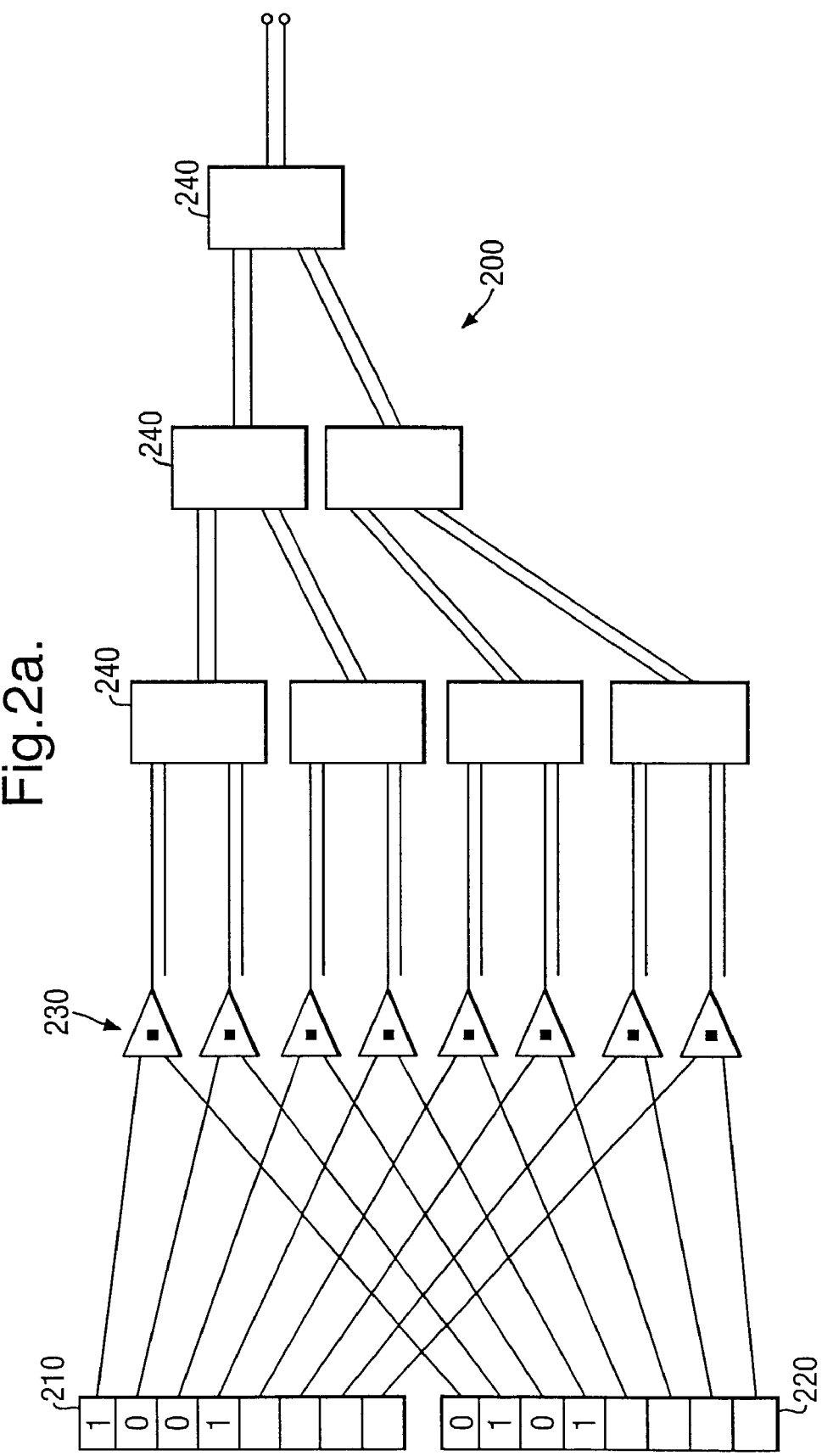

FIG. 2a shows an apparatus 200 embodying a binary logic tree that allows the above processing to be performed sequentially in order to find the first free, common middle-stage switch more quickly. The logic tree comprises outlet status array 210 and inlet status array 220, each status array having m elements. The outlet status array 210 contains the status of the m outlets connected to one of the first stage switches $A_i$, and the inlet status array 220 contains the status of the m inlets connected to one of the third stage switches $C_j$. A '0' entry in the array indicates that the outlet (or inlet) is in use and a '1' entry in the array indicates that the outlet (or inlet) is available to be used. The two status arrays are logically compared using an array of m AND gates 230, such that a logic '1' output is produced only when both an outlet and its corresponding inlet are free. The statuses of all outlet and inlet pairs are made available simultaneously using parallel logic gates.

One of the resulting free inlet/outlet pairs (there may be only one such pair) is selected by comparing the outputs from the AND gate array 230 using the array of binary comparison elements 240. FIG. 2b shows the structure of such a binary comparison element 240 and FIG. 2c shows the truth table for the binary comparison element 240. If only one of the inlet/outlet pairs is available, then the binary comparison element 240 will pass this availability data and the addresses of the available inlet and outlet pair (the addresses may be passed either sequentially or in parallel and has the form of $\log_2 m$ bits) to the next stage of comparison using a binary comparison element 240. If both sets of inlet/outlet pairs are free, then, for example with the combination element and truth table shown in FIGS. 2a & 2b, the inlet/outlet pair on the uppermost input of the binary comparison element is chosen as the output. Thus, after $\log_2 m$ stages of comparisons, the address of a free inlet/outlet pair being switched to the output of the binary tree 200, which should be the 'uppermost' free pair in the two status arrays 210 & 220.

Assuming that the address bits are switched in a parallel bus, the number of computing steps needed to find the first free middle-stage switch is simply the number of binary tree stages, i.e. $\log_2(2m)$. Thus, the total computing time for N connections is $O(N \log_2(2m))$, which for the above assumptions results in $O(N \log_2 N)$ computing steps.

As an alternative to the above method it is possible to handle connection requests in parallel rather than sequentially, so that the paths for N connections can be computed simultaneously. A number of connection requests could be collected, up to the full throughput of the switch N, which could then be processed together. In this approach, all the connections wanted between a pair of first and third stage switches, e.g. $A_2$ and $C_3$ in FIG. 1, are computed simultaneously. Every first stage switch has a processor associated with it (alternatively they could be associated with the third stage switches) so there are N/n (or p) outer-stage processors. Each of these processors must interrogate each of the third stage switches in turn (N/n [or p] of them), and for each one find up to n free common inlet/outlet pairs to middle-stage switches, depending on the precise number of connections required between that pair of switches, $A_i/C_j$. To do this it must interrogate the status of all m middle-stage switches. Beginning, for example, with $A_1/C_1$, it will be possible for first and third stage switches $A_2/C_2$ to compute their set of common, free middle-stage switches at the same time, and this parallel processing holds for all $A_i/C_j$. When all these parallel computations have been completed, the first and the third stage switch pairings are cycled around by one, so that all $A_i/C_{j+1}$ switch pairings are computed in parallel. This continues until all N/n input switches have been paired with all N/n third stage switches, taking N/n steps. For each pairing of first and third stage switches, it is necessary to compute up to n separate connections.

Once all of the possible connections between a given first stage switch and a given third stage switch have been established, one of these connections will be selected and the connection made between the first stage switch and the third stage switch.

FIG. 3a shows a concentrator 300 that can compute these connections in parallel, packing the addresses of all free, common middle-stage switches together onto its output lines. Concentrator 300 comprises outlet status array 310, inlet status array 320, AND gate array 330 and an array of binary comparison elements 340. FIG. 3b shows the structure of the binary comparison element 340 and FIG. 3c shows the truth table for the binary comparison element 340. The outlet status array 310 and the inlet status array 320 each have m elements, the elements having a '1' status to indicate that the associated middle stage switch is available and a '0' status to indicate that the associated middle stage switch is in use. The two status arrays 310 & 320 are logically compared using the array of m AND gates 330, such that a logic '1' output is produced only when both an outlet and its corresponding inlet are free. The binary comparison elements 340 process the outputs of the AND gate array 330 so that all of the '1' logic states are grouped together on the uppermost output lines, along with the address of the associated middle-stage switch. The apparatus of FIG. 3 will guarantee to find up to n free switches in 3n–3 stages, using 3n(n–1)/2 comparison elements. The total number of computing steps that results is O(N) and the number of comparison elements required is $O(N^{3/2})$ using the previous optimum switch design. This allows all N connections through a 3-stage packet switch to be computed in at most linear time.

Figure 5:
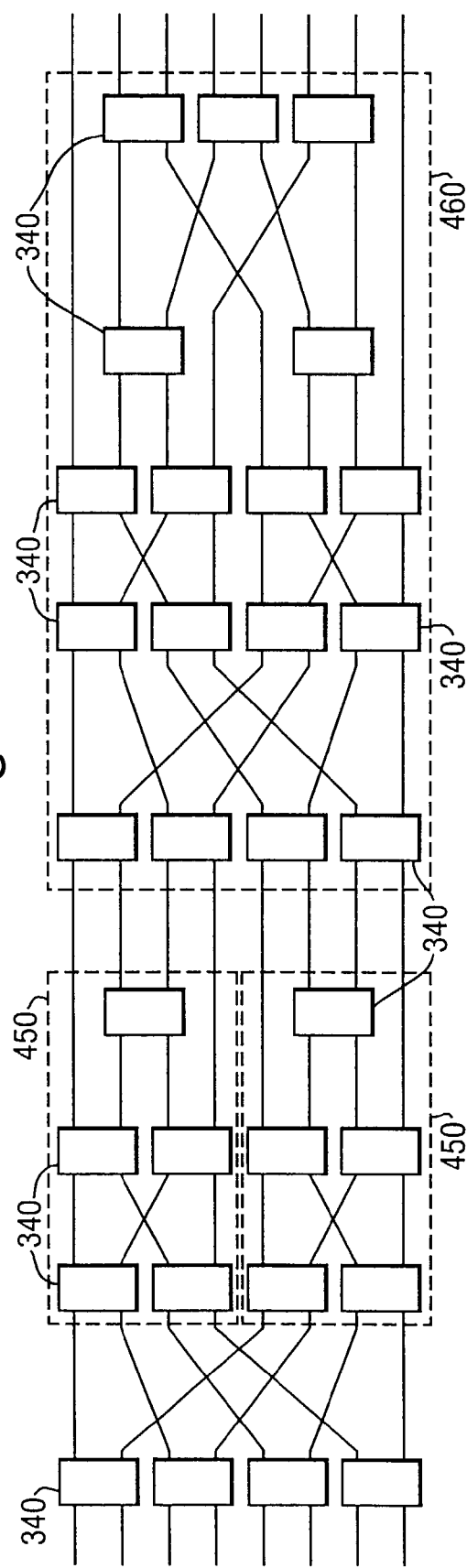
FIG. 5 is a depiction of a (8,8) concentrator according to an exemplary embodiment of the present invention.

FIG. 4 shows an alternative to the concentrator shown in FIG. 3. The multi-stage concentrator 400 shown in FIG. 4 has outlet status array 310, inlet status array 320 and AND gate array 330, as shown in FIG. 3. The outputs of the m AND gates are fed into an (m,m) concentrator 490, which comprises m/2 binary combination elements 340 (as shown in FIGS. 3b & 3c), two (m/2, m/2) concentrators 450, and an m×m rearrangeable switching network 460. FIG. 5 shows how the (m/2, m/2) concentrator 450 and the m×m rearrangeable switching network 460 may be constructed using a plurality of binary combination elements 340 for m=8. The concentrator 490 has an iterative structure, consisting of three parts. The first is a single input stage of comparison elements 340, which feed the second part, which consists of two (m/2, m/2) concentrators 450, i.e. two half-concentrators. These concentrate any logic ones on their inputs to their upper output lines. This is essential for feeding the final part of the (m,m) concentrator 490, which consists of binary comparison elements 340 configured in the form of an m×m rearrangeable switching network 460 (or permutation network). The overall effect of this particular example of an (m,m) concentrator is to pack the free, common middle-stage switch addresses into the uppermost output lines of the concentrator. FIG. 5 shows an example of an (8,8) concentrator, which for simplicity, just shows how the logic input and output ports a, b, e and g of each comparison element are connected, i.e. the address bus has been omitted.

In general the number of stages required in the concentrator can be shown to be $O((\log_2 m)^2)$, and it uses $O(m(\log_2 m)^2)$ comparison elements. The total number of computing steps is $O(N^{1/2}(\log_2 N)^2)$ for an optimally designed 3-stage Clos switch, and the total number of processing elements is $O((Nm/n)(\log_2 m)^2) = O(N(\log_2 N)^2)$.

Figure 6:
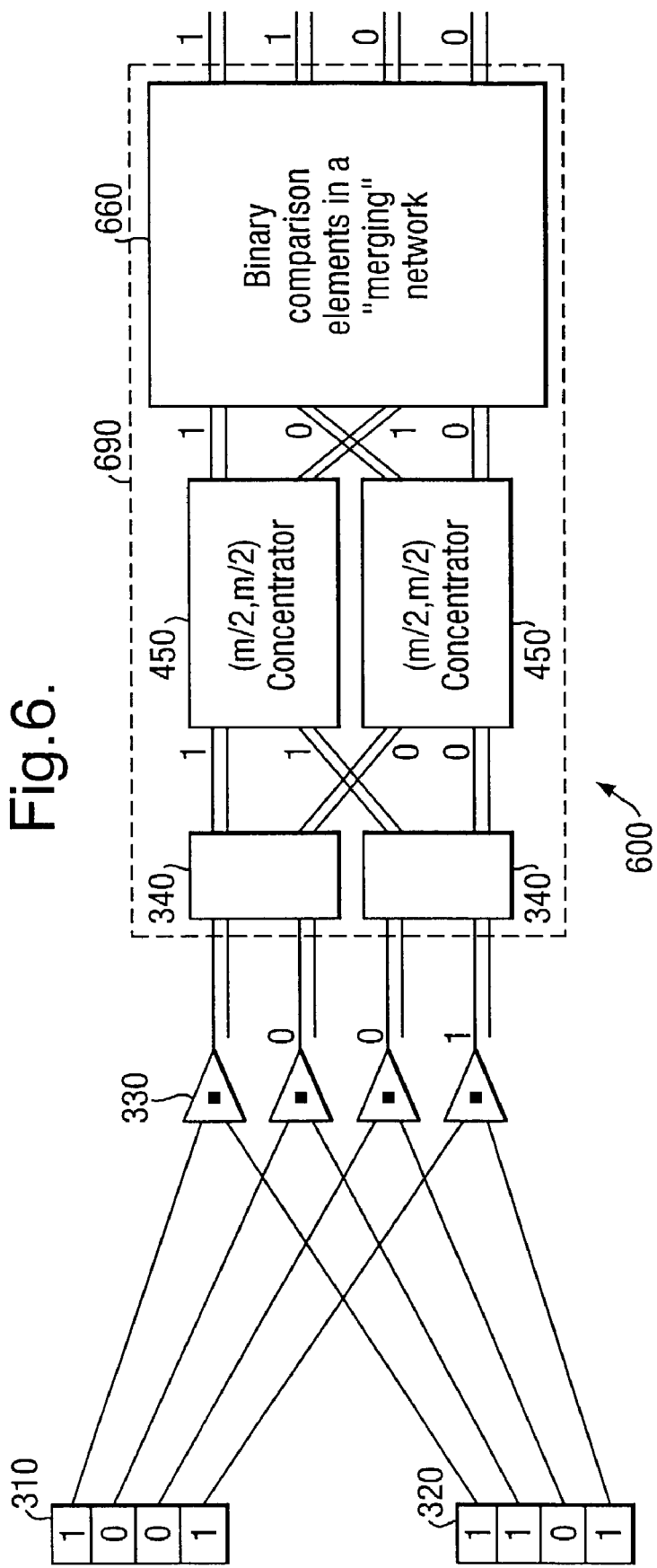
FIG. 6 is a schematic depiction of a concentrator according to a second exemplary embodiment of the present invention.

FIG. 6 depicts an alternative embodiment of the present invention, comprising an alternative design for the (m,m) concentrator 690, which uses $\log_2(m/2)$ stages of comparison elements as a merging network 660 for the third part of the concentrator 600, instead of a m×m rearrangeable switching network 460. The remainder of the multistage concentrator 600 is as the multistage concentrator 400 shown in FIG. 4. Analysis indicates that merging networks require a significantly lower number of binary comparison elements 340 than re-arrangeable switching networks and also require fewer stages of comparison elements for the concentrator design.

It can be shown that the number of stages needed to construct a concentrator increases as a series, $$S(m,m) = \sum_{i=1}^{\log_2 m} i,$$

which for $\log_2 m$ terms is $S(m,m) = ((\log_2 m)^2 + \log_2 m)/2$ and the number of binary comparison elements in the (m,m) concentrator is $O(m(\log_2 m)^2)$. The total number of computing steps is $O((N^2 n).(\log_2(2n))^2)$, which for an optimum 3-stage packet switch with $n \approx (N/2)^{1/2}$ is $O(N^{1/2}(\log_2 N)^2)$. The total number of comparison elements is $O((N/2).(\log_2 n)^2)$, which for an optimum 3-stage packet switch with $n \approx (N/2)^{1/2}$ is $O(N(\log_2 N)^2)$ FIG. 7 shows a refinement on the structure of an (8,8) concentrator for the strictly non-blocking 3-stage switch. Because m=2n–1, m is always odd, so the concentrator actually requires only 7 inputs and 4 outputs (i.e n=4). The 4 outputs could all come from the outputs of the top half-concentrator, or could be distributed between the top and bottom half-concentrators, but never all through the bottom one (as it only has three inputs). Consequently, the top half-concentrator must have a full (((m+1)/2), ((m+1)/2)) structure, i.e. (4,4), but the bottom one has one less input and, in this case, two fewer outputs, and so it need only be a (3,2) concentrator. FIG. 7 shows the resulting (7,4) concentrator 900 structure, which comprises 3 binary comparison elements 340, a (4,4) concentrator 910, a (3,2) concentrator 920 and a 2 stage merging network 930. The (4,4) concentrator 910, (3,2) concentrator 920 and the 2 stage merging network 930 are all formed from a plurality of binary comparison elements 340.

Figure 8A:
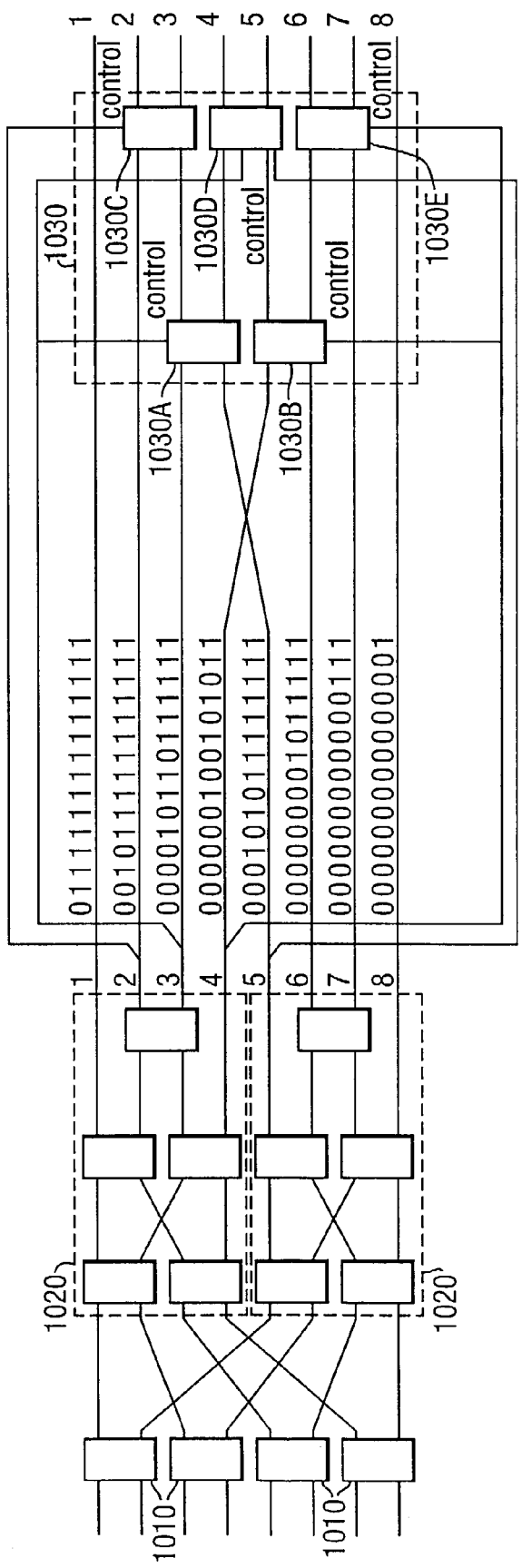

If the $\log_2(m/2)$ logic stages of the merging network part of a concentrator were to be replaced by a single logic step, then the iterative procedure for constructing large concentrators out of smaller concentrators would no longer grow as $O((\log_2 m)^2)$, but as $O(\log_2 m)$, i.e. in a similar fashion to the iterative procedure for constructing large permutation networks. FIG. 8a shows an example of the structure of an (8,8) concentrator. The concentrator 1000 comprises four binary comparison elements 1010, two (4,4) half concentrators 1020 and a two stage merging network 1030 formed from five switching elements 1030A, 1030B, 1030C, 1030D & 1030E. FIG. 8b shows the structure of binary comparison element 1010 and FIG. 8c shoes the truth table of the binary comparison element 1010. Binary comparison element 1010 comprises an OR gate 1011, a 2×2 switch 1012 and an AND gate 1013. Inputs a and b carry data regarding the availability of middle stage switches, whilst inputs c and d carry the address of the respective middle stage switch (FIG. 8a shows only the data buses and omits the address buses for the sake of clarity. Each (4,4) half concentrator 1020 comprises 5 binary comparison elements 1010 configured as shown in FIG. 8a. The two half-concentrators produce eight data outputs 1021-1028, with 1021 being the uppermost output and 1028 the lowermost output as shown in FIG. 8a. The two stage merging network 1030 is formed from five switching elements 1030A-1030E. FIG. 8d shows the structure of switching elements 1030A-1030E and FIG. 8e shoes the truth table of the switching elements 1030A-1030E. Switching elements 1030A-1030E comprise a NOT gate 1031, and two 2×2 switch 1032 & 1033. Inputs a and b carry data regarding the availability of middle stage switches, whilst inputs c and d carry the address of the respective middle stage switch. The control signals applied to the NOT gate of switching elements 1030A-1030E are taken from the data outputs of the half-concentrators.

The concentrator 1000 differs from the previous (8,8) concentrator structures by using some of the half-concentrator outputs as control inputs for the two stages of switching elements in the merging network. The switching elements are no longer used as logic elements, but the control inputs from the half-concentrators set the states of the 2×2 switches. These can all be set simultaneously by their control inputs, so there is only one logic "toggle" delay for all switches. The half-concentrator output logic states and addresses now propagate through the previously set switches, incurring no more "toggle" delays through the multiple stages of the merging network, but only propagation delays and any bandwidth narrowing through each switch. If the logic and switch elements are implemented electronically, e.g. with transistors, where propagation delays may be small due to chip integration, benefits may be gained if bandwidth narrowing per switch stage is less than the equivalent inverse "toggle" delay of a logic gate. If all-optical interferometric switches are considered for the implementation technology, the bandwidth narrowing can be extremely small per stage (e.g. around $10^{12}$ Hz bandwidth is possible per stage using psec pulses), while the "toggle" rate may be far lower (e.g. 10 Gbit/s). This apparently enormous benefit of all-optical switching will of course be offset by the relatively long propagation delays, due to lower levels of integration in optics, but these propagation delays will decrease as optical integration technology advances.

FIG. 8a shows all the possible permutations of logic states at the half-concentrator outputs 1021-1028. There are far less permutations at this location in the concentrator than at its overall inputs. At the half-concentrator outputs, the logic 1's representing free, middle-stage switch addresses are concentrated or packed into the uppermost output outputs of each of the two half-concentrators. Now these two sets of 1's must still be packed together, side by side, but there can be outputs of the top half-concentrator, between these two sets of 1's, that are in the 0 logic state. However, because the 1's from the top half-concentrator are packed together, this means that any 0's are also packed together. So each of the m/2−1 top half-concentrator outputs that could be separating logic 1's can be used to control one of the merging network switches. Let us start by considering the data output 1024. When this is in the 0 state, we want to switch all possible 1's in outputs 1025, 1026 and 1027 up by one output, i.e. to outputs 1024, 1025 and 1026. This is achieved by controlling switches 1030B and 1030E by output 1024, such that they are switched to the crossed state when output 1024 is in the 0 state. When the logic 0 from output 1024 now propagates through switch 1030B, it will be routed out of the way, closing the gap between the two sets of 1's if there is only one logic 0 on output 1024. But if there is also a logic 0 on output 1023, from the permutations shown in FIG. 8, we therefore need at most to switch outputs 1025 and 1026 up to outputs 1023 and 1024. Output 1023 must therefore control switches 1030A and 1030D. Switch 1030B has already been taken care of (controlled) by output 1024's logic 0. The fact that switch 1030E is also crossed does not matter, since when there are two logic 0's, in outputs 1023 and 1024, it will simply swap over the logic 0's on its outputs, which makes no difference. The two logic 0's are now removed from between the sets of logic 1's. If output 1022 is also a logic 0, so there are three logic 1's together on outputs 1022, 1023 and 1024, then we need to do no more than switch output 1025 to output 2. So output 1022 should control switch 1030C. All other switch settings 1030A, 1030B, 1030D and 1030E don't matter. In this way three logic 0's will be removed, enabling the two 1's to be together on outputs 1021 and 1022. There is one additional problem that when output 1024 is in the 1 state, all switches 1030A-1030E will be in the through state, and so the crossed wiring pattern between lines 1024 and 1025 will cause a 0 on output 1025 to be raised to output 1024 (thus creating a new gap between the logic 1s). There is only one permutation out of the 15 where this happens. This is solved, when output 1025 is in the 0 state, by using this output as a second control input to switch 1030D, in order to allow the logic 1 from output 1024 to be raised back to output 1024. Switch 1030D will be in the crossed state if either output 1023 or output 1025 are in the 0 state.

The number of stages of switching elements remains as above, but the number of logic steps can be reduced. Let us assume the number of logic steps for a (4,4) concentrator is 3 (as before). The number of steps for an (8,8) concentrator will be S(8,8)=1+S(4,4)+1=2+S(4,4) because a concentrator requires two half-concentrators sandwiched between a left-hand logic stage and a right-hand merging network. Similarly, S(16,16)=1+S(8,8)+1=2+2+S(4,4) and S(32,32)=1+S(16,16)+1=2+2+2+S(4,4), so S(m,m)=2 $\log_2(m/4)$+S(4,4)=2 $\log_2 m$−1. (If additional regeneration were required after every merging network within a concentrator, then S(m,m)=3 $\log_2 m$−3 stages). The total number of computing steps required is $O((2N/n)\log_2 n)$ which for an optimum 3-stage packet switch with $n \approx (N/2)^{1/2}$ is $O(N^{1/2} \log_2 N)$. The total number of logic and switching elements is the same as when the merging networks are used as multiple stages of logic elements, i.e. $O(N(\log_2 N)^2)$.

By careful design of the link pattern between the half-concentrators and the merging network, it is possible to reduce the logic complexity to such an extent that it becomes possible to implement the merging network with just a single stage of switches and/or gates, controlled by the logic states of the half-concentrator output links. This ensures $O(\log_2 m)$ overall growth rate for the number of stages of both logic and switch elements in a concentrator. There is more than one way of achieving this, but the embodiment shown in FIG. 9 and described below is one example of such a solution. For an (8,8) concentrator, the half-concentrator output link permutations shown in FIG. 8 are examined, and ranked in order of the leftmost position that a logic 1 can appear in a link, over all the permutations. The order is 1021, 1022, 1025, 1023, 1024, 1026, 1027, 1028. FIG. 9a shows the link pattern between half-concentrator outputs and the merging network re-arranged in this order, for an (8,8) concentrator 1100. The concentrator 1100 has the same structure as the concentrator of FIG. 8a, except that the two stage merging network 1030 is replaced by a single-stage merging network 1130 which comprises elements 1130 which comprises elements 1130A-1130G, where elements 1130D, 1130E & 1130F are on/off gates and the other elements 1130a-1130C & 1130G are 1×2 switches. FIG. 9b shows the control of the elements 1130A-1130G by the data links. Each element 1130A-G is controlled by only one link, except the gate that prevents a logic 1 on link 6 from exiting on that output port when the gates connecting it to either port 4 or port 5 are "on". It is evident from the permutations of 1s that many of the permutations (6 of them for an (8,8) concentrator) still have gaps which need to be closed up by the 1s below them. The 1s to be used for this are chosen with as simple a rule as possible. Every link that can possess a gap has logic to decide whether the particular permutation extant is currently producing a gap in that link. This can simply be achieved by recognising a 0 state in the link itself, and a 1 state in the link above it, i.e. NOT(link$_i$) AND (link$_{i-1}$). When this occurs, the 1s below the link are switched upwards appropriately to fill the gap. But for larger concentrators than (8,8) this will have the added complication that more than one link can have a gap (as defined above) within the same permutation, and so a decision must be made as to which link should control the raising of 1s below it. It should be the uppermost link having a gap. To decide which is the uppermost link with a gap, all links with gaps that could have links with gaps above them must also be logically controlled by those higher links, so that they can be disabled by the higher links (with gaps) from controlling switches or gates.

This is not required in the (8,8) concentrator example shown in FIG. 9a. The numbers in brackets on the links indicate the output ports to which the links may need to be switched. Most need to be switched only to one other output port, and only link 6 needs to be switched to two possible other output ports. With this single-stage merging network, the number of concentrator stages is again S(m,m)=2 $\log_2 m - 1$, and the total number of computing steps is again $O(N^{1/2} \log_2 N)$ for an optimum 3-stage packet switch with $n \approx (N/2)^{1/2}$. The number of logic and switching elements depends on the particular concentrator structure. The one described above requires $O(m^2/8)$ gates and/or switches in the merging network, and hence $O(m^2/8)$ for a complete concentrator. So, overall there would be $O(N^{3/2})$ for an optimum 3-stage packet switch with $n \approx (N/2)^{1/2}$.

Other concentrator designs are known, e.g. Ted H. Szymanski, "Design principles for practical self-routing non-blocking switching networks with O(N. log N) bit-complexity," IEEE Trans. On Computers, vol. 46, no. 10, 1057-1069 (1997) and Joseph Y Hui, Switching and Traffic Theory for Integrated Broadband Networks, Kluwer Academic Publishers, 1990, Chapter 4) and these concentrator structures may also be used with the above parallel path search algorithm to achieve the same number of computing steps, i.e. $O(N^{1/2} \log_2 N)$.

Connection requests in a 3-stage switch are conventionally handled sequentially (see FIG. 10). Before path-searching is performed on a new connection request, it is first established whether the output port is free, and willing to accept the connection. This can simply be achieved by interrogating the status of the desired output port. Since there are N such ports, this needs only a decoder of $\log_2 N$ stages. For N sequential connection requests, this would take $O(N \log_2 N)$ steps. There follows a possible implementation for minimising the number of processing steps needed to ensure no overbooking when all N requests are processed in parallel, as in the method of the present invention.

FIG. 11 shows an apparatus for determining the address of available middle-stage switches. The decoder comprises a number of shift registers 1310, a decoder 1320 and a array 1330 containing a list of output port statuses. If each output port is represented by a bit of information representing its status (free or connected), then a simple list of N bits is needed. To establish whether a requested output port is free, one simply has to switch a request bit to the desired memory location in the list, and if it is free, allow the request bit through to provide a time sequence of accepted requests. $\log_2 N$ shift registers 1310 would clock out the $\log_2 N$ output address bits in parallel to the stages of a decoder 1320. A single clock bit would then be routed through to the requested list location 1330. By staggering the shift registers, each clock bit would be switched by successive address bits of the same request at each decoder stage. This allows all N requests to be processed in O(N) steps. The successful request bits allowed through the status list (using simple logic in each list location) are connected into a single sequential stream of acceptance bits. The time location of these identifies the specific requests. In essence this method allows connection requests to be processed as a sequential series of bits, rather than of address words. The processing of N connection requests in this way reduces the number of processing steps needed to ensure no overbooking in a 3-stage switch by a factor $O(\log_2 N)$, i.e. from $O(N \log_2 N)$ to $O(N)$, with respect to the conventional sequential processing of connection requests. No overbooking can therefore be ensured using far fewer steps (O(N)) than the conventional path-searching algorithm ($O(N^{3/2})$). This method has the same complexity as the polling technique described in Joseph Y Hui, Switching and Traffic Theory for Integrated Broadband Networks, Kluwer Academic Publishers, 1990, Chapter 6, and suffers from a similar drawback that earlier cell requests have an unfair advantage in seizing the output port. The "probe-acknowledge-send" method of resolving output port conflicts described by Hui requires fewer steps ($O(\log_2^2 N)$), by employing a Batcher sorting network, but requires $O(N \log_2^2 N)$ components.

There are two steps in the path-search algorithm, both of which are needed in order to decide how every individual switch of the 3-stage network must connect its inputs to its outputs, according to the present invention. In the first step, every first-stage switch has a 1×n matrix of connection requests, representing the requested destination of each input port. Each entry contains at least the $\log_2 N$-bit destination addresses, and possibly also the source address, as well as perhaps some other parameter values. Furthermore, every first-stage switch also has an associated list giving the statuses of its m=2n−1 output ports, which records which middle-stage switches are seized and which are free from that first-stage switch. Every third-stage switch has a similar status list which will provide the statuses of all the links to the middle-stage switches from that third-stage switch. At the end of the algorithm, the first-stage matrix will also hold the addresses of the middle-stage switches allocated to each connection, and the first- and third-stage lists will hold the addresses of the connections using those middle-stage switches. Overall there are N/n iterations and in each one, the matrix and list of each first-stage switch are paired with the list of one third-stage switch, such that any first- or third-stage switch is involved in only one pairing.

Figure 12:
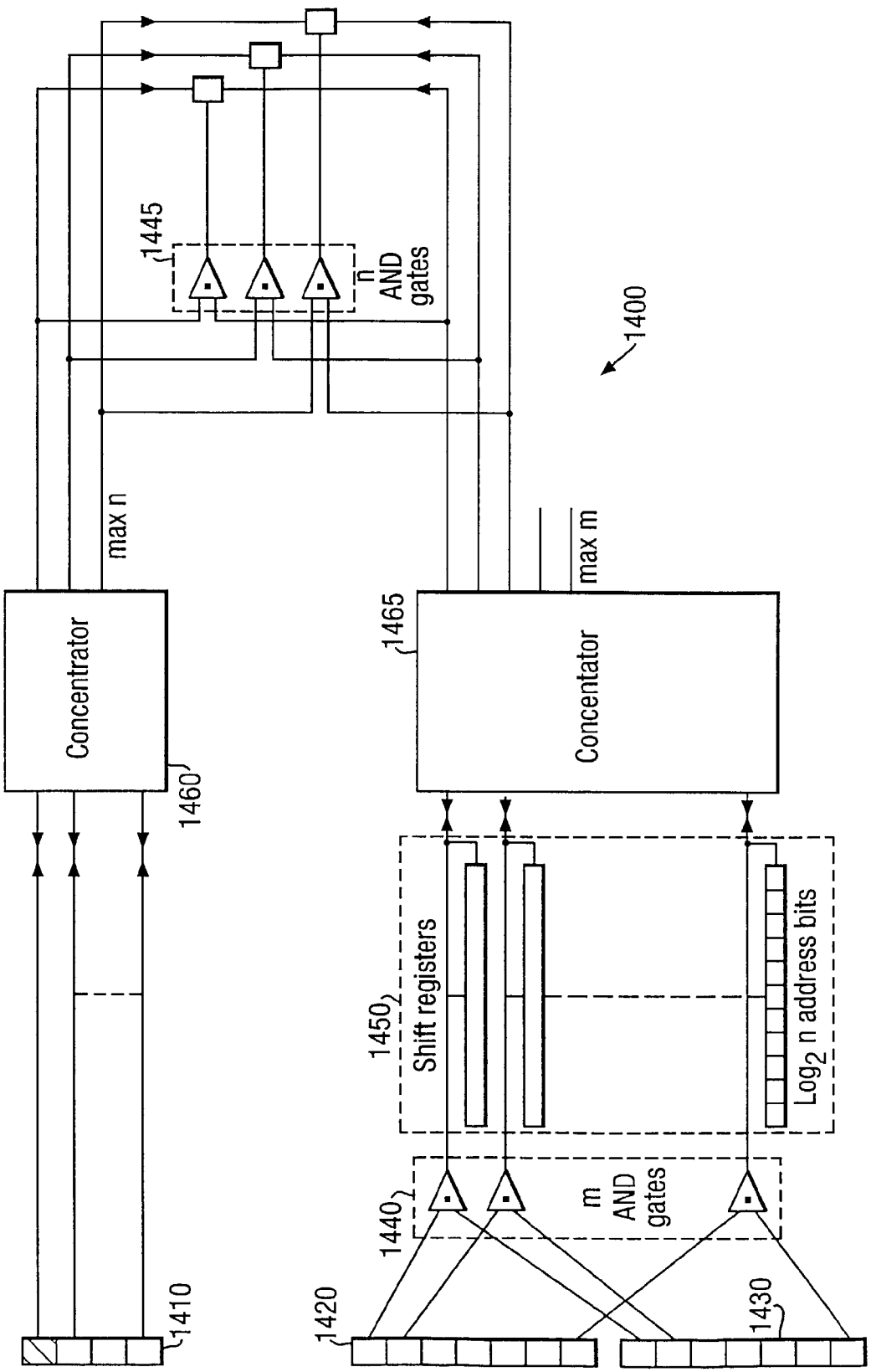
FIG. 12 is a schematic depiction of a processor for use in determining in parallel the address of a common middle-stage switch according to an exemplary embodiment of the present invention.

FIG. 12 shows the structure of each of the N/n processors 1400 that are required. Each processor 1400 comprises a first stage connection request matrix 1410, a first stage status list 1420, a third stage status list 1430, a first array of AND gates 1440, a plurality of shift registers 1450, a first concentrator 1460, a second concentrator 1465 and a second array of AND gates 1445. The first stage connection request matrix 1410 is connected to the first concentrator 1460. The outputs of the first stage status list 1420 and the third stage status list 1430 are logically combined in the first array of AND gates 1440, which has m AND gates. The first element of the first stage status list 1420 is combined with the first element of the third stage status list 1430 in the first AND gate of the array 1440, and so on for all m elements of the first stage status list and the third stage status list and the array of AND gates. The outputs of the AND gate array 1440 are concentrated using second concentrator 1465 such that all common, free middle-stage switches are connected to at most m adjacent links 1475. At the same time the contents of the first stage connection request matrix 1410, i.e. the first-stage connection requests wishing to connect between that particular pair of first- and third-stage switches, are passed through the first concentrator 1460, such that the connection requests can be concentrated onto at most n adjacent links 1470. Both of the concentrators 1460 & 1465 can operate bi-directionally, or possess two sets of switches/gates, in order to provide two separate contra-directional paths. Both of the concentrators are simultaneously concentrating another of the pairings.

The second array of AND gates 1445, comprising n AND gates, enables the required number of connection requests (up to n) to allow address information to pass in each direction via switches or gates 1490 as follows, while the established routes through the concentrators are held in place. The first-stage connection request addresses are routed to the first- and third-stage status lists, where they are stored in the appropriate middle-stage switch locations. The $\log_2 N$ address bits can be transmitted sequentially, i.e. pipelined. The state of one additional bit location can be changed to signify the seizure of that middle-stage switch from the first-stage switch. In the opposite direction, preferably simultaneously, the addresses of the common, free middle-stage switches are routed through to the first-stage connection request locations and stored there. The middle-stage switch addresses can be simply generated by simultaneously clocking them sequentially from the respective one of the plurality of shift registers 1450.

The first-stage and third-stage switch pairings can now be cycled to the next set of pairings. This can be simply achieved by transmitting the first-stage matrix and list to the next adjacent processor. Alternatively, transmission requirements would be lower if instead only the third-stage list were transmitted to the adjacent processor. The first processor would transmit its third-stage list to the N/n−1th processor. The iterations continue until all first-stage and third-stage switches have been paired together. At the end of this first path-searching step, all first- and third-stage switches have sufficient information to determine which of their output ports to connect to each of their input ports.

Assuming that the concentrators have the structure described by Szymanski, op cit, each status list concentrator has $O(3 \log_2 m)$ stages and each connection request concentrator has $O(3 \log_2 N)$ stages. For all N/n iterations, therefore, the middle-stage switch addresses take $O((N/n)(3 \log_2 m+3 \log_2 N+\log_2 m))$ steps to be completed, and the connection request addresses take $O((N/n)(3 \log_2 m+4 \log_2 N))$ steps. The latter is the larger, and therefore represents the number of computing steps needed to allocate middle-stage switches to all connections in the first- and third-stage switches.

In the second step of the path-search algorithm, the 1×N/n connection matrix for each middle-stage switch is computed. This is very simple, because the first-stage status lists already contain all the information. Using N links between the first-stage lists and a set of middle-stage connection matrix data memories, all destination port address bits can be transmitted sequentially in only $\log_2 N$ steps, which is much faster than the first step. Of course this could be slowed down, if desired, by using fewer links with more steps. The middle-stage switches now have all address information necessary to connect their input ports to their output ports.

It is also possible to compute up to n separate connections for any $A_i/C_j$ pair of first and third stage switches by using a single processor to interrogate the status of each common, middle-stage switch in turn (m steps to go through all possible middle-stage switches). Although the overall number of computing steps is increased to O(N) again, the number of processors required is greatly reduced to just N/n, i.e. $O(N^{1/2})$. The advantage of the present invention is that the fastest parallel algorithm found for ensuring no overbooking in a 3-stage packet switch takes O(N) time using $O(N \log_2 N)$ components, which is a lower component count than the existing "probe-acknowledge-send" method of resolving output port conflicts which requires fewer steps ($O(\log_2^2 N)$), but uses more components $O(N \log_2^2 N)$.

A range of computing times have been found for solving the path-searching problem, the fastest of which takes sub-linear time $O(N^{1/2} \log_2 N)$ using $O(N \log_2 N)$ components by employing a new, highly parallel processing algorithm making use of existing multi-stage concentrator designs. Although the known parallel looping algorithm is potentially faster, requiring either $O(\log_2^3 N)$ computing steps using the same number $O(N \log_2^3 N)$ of components, or $O(\log_2^2 N)$ computing steps using $Q(N^2)$ components, the use of Szymanski's self-routeing switch structure in the former may only be asymptotically useful for large N, and full interconnection in the latter may require far too much hardware.

The exemplary embodiments of the present invention provide a method whereby third stage switches can be identified in order to route a packet from a desired input port to a desired output port. It should be understood that the method of the present invention is compatible with all manner of switch fabrics and methods of avoiding fabric contention. However, it is preferred that the fabric contention avoidance method described in the applicant's co-pending United Kingdom patent application GB0006084.8 corresponding to published US Patent Application US 2003/0035422 A1 (the contents of which are hereby incorporated by reference) is implemented.

It will be understood that the algorithms and structures described above are equally applicable to either optical, electronic or opto-electronic switches. The person skilled in the art will readily appreciate that the invention also includes different combinations of Boolean logic and logic elements that achieve the same, or similar results, as those described above, e.g. replacing AND gates with NAND gates and changing the '0' and '1' signals appropriately, etc. Although the above description has assumed that the three-stage switch is strictly non-blocking, i.e. m=2n−1, the invention is still applicable to those three stage switches having lower values of m.

What is claimed is:

1. A method of handling connection requests in a packet switch by identifying available time slot(s) in said packet switch comprising multiple input ports and multiple output ports in order to route a packet from an input port to a designated output port, the method comprising:

logically combining the status of each time slot with regard to the input port and with regard to the output port to generate the status of the time slot with regard to the given input port-output port pair;

logically combining in pairs the status of input port-output port pairs to determine whether one of the input port-output port pairs is available; and computing the paths for the connections between each input port-output port pair until an available input port-output port pair has been identified wherein a plurality of connection requests are collected and handled together by simultaneously computing paths for the connections between each requested input port-output port pair in parallel.

2. A method as in claim 1 wherein the paths for the connections between each input port-output port pair are computed in parallel by simultaneously performing said step of logically combining in pairs the status of input port-output port pairs until an available input port-output port is identified by a selection process.

3. A method as in claim 1 wherein the paths for the connections between each input port-output port pair are computed in parallel by processing the input-output port pair status information generated in the step of logically combining the status of each timeslot in a logical concentrator so that the available input port-output port pair(s) are ordered hierarchically.

4. A method of handling connection requests as in claim 1, the method further comprising allocating connection requests by:

establishing switch connection request data at each input port;

processing the switch request data for each input port to generate connection request data for each input port-output port pairing;

comparing the number of connection requests from each input port and to each output port with the maximum connection request capacity of each input port and each output port;

allocating all connection requests for those input-output pairs where the total number of connection requests is less than or equal to the maximum connection request capacity of each input port and each output port;

reducing the number of connection requests for those input-output pairs where the total number of connection requests is greater than the maximum connection request capacity of each input port and each output port such that the number of requests is less than or equal to the maximum request capacity of each input port and each output port;

allocating the remaining connection requests; and handling the allocated connection requests using the identified available time-slots.

5. A method of handling connection requests as in claim 1, the method further comprising allocating connection requests by:
(a) establishing switch connection request data at each input port;
(b) processing the switch connection request data for each input port to generate connection request data for each input port-output port pairing;
(c) allocating a first switch connection request from each of the input port-output port pairing connection request data, the connection requests being allocated only if a maximum connection request capacity of the respective output port has not been reached;
(d) allocating further switch connection requests by the iterative application of step (c) until the maximum connection request capacity of each output port has been reached; and
(e) handling the allocated connection requests using the identified available time-slots.

6. A method of handling connection requests as in claim 1, the method further comprising allocating connection requests by:
(a) establishing switch connection request data at each input port;
(b) processing the switch connection request data for each input port to generate connection request data for each input port-output port pairing;
(c) identifying a first switch connection request from each of the input port-output port pairing request data;
(d) identifying further switch connection requests by the iterative application of step (c) until all of the switch connection request data has been identified;
(e) subject to the maximum request connection capacity of each input port and each output port, allocating all of the identified switch connection requests;
(f) reserving unallocated switch connection requests for use in the next phase of switch connection request allocation; and
(g) handling the allocated connection requests using the identified available time-slots.

7. A packet switch comprising:
one or more processors;
said processors including means arranged to implement each step in claim 1.

8. A packet switch comprising a plurality of input ports and a plurality of output ports, the switch being arranged to handle connection requests by identifying available time slot(s) in said switch in order to route a packet from one of said input ports to a designated one of said output ports, the switch comprising at least one processor including:
means to logically combine the status of each time slot with regard to the input port and with regard to the output port to generate the status of the time slot with regard to the given input port-output port pair;
means to logically combine in pairs the status of input port-output port pairs to determine whether one of the input port-output port pairs is available; and
means to compute paths for the connections between each input port-output port pair until an available input port-output port pair has been identified,
wherein a plurality of connection requests are collected and handled together by simultaneously computing the paths for the connections between each requested input port-output port pair in parallel.

* * * * *